(12) United States Patent
Toui et al.

(10) Patent No.: US 6,562,903 B2
(45) Date of Patent: May 13, 2003

(54) CLEAR COATING FOR TOP COATING OF AUTOMOBILES, METHOD OF FORMING MULTILAYER COATING AND AUTOMOTIVE BODY

(75) Inventors: Teruzo Toui, Nara (JP); Hisaki Tanabe, Kyoto (JP); Nobuhisa Sudo, Hiroshima (JP); Hiroshi Kubota, Hiroshima (JP); Takakazu Yamane, Hiroshima (JP)

(73) Assignees: Nippon Paint Co., Ltd., Osaka (JP); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/870,776

(22) Filed: Jun. 1, 2001

(65) Prior Publication Data

US 2002/0015795 A1 Feb. 7, 2002

(30) Foreign Application Priority Data

Jun. 1, 2000 (JP) ...................................... 2000-164224

(51) Int. Cl.$^7$ .................................................. C08F 8/00
(52) U.S. Cl. ........................ 525/100; 525/63; 525/92 G
(58) Field of Search ........................ 525/100, 63, 92 G

(56) References Cited

U.S. PATENT DOCUMENTS 5,756,221 A * 5/1998 Horibe et al. ............... 428/626

2002/0010271 A1 * 1/2002 Toui et al.

FOREIGN PATENT DOCUMENTS

JP 11080649 3/1999 ......... C09D/133/02

* cited by examiner

Primary Examiner—James J. Seidleck
Assistant Examiner—Olga Asinovsky
(74) Attorney, Agent, or Firm—Sughrue Mion, PLLC

(57) ABSTRACT

A clear coating for top coating of automobiles
  which comprises a half-esterified acid group-containing acrylic copolymer (I) and a silicate-grafted acrylic copolymer (II) as resin constituents,
  said half-esterified acid group-containing acrylic copolymer (I) being obtainable by:
    preparing a copolymer from an acid anhydride group-containing, radical-polymerizable monomer (I-a) and another radical-polymerizable monomer (I-b) and then half-esterifying said acid anhydride group with a low-molecular alcohol compound,
  said silicate-grafted copolymer (II) being obtainable by grafting a silicate compound (II-B) onto a hydrolyzable silyl-containing copolymer (II-A),
  the amount of said silicate compound (II-B) grafted being 5 to 50% by mass (on solids basis) relative to the total amount of said resin constituents.

2 Claims, No Drawings

CLEAR COATING FOR TOP COATING OF AUTOMOBILES, METHOD OF FORMING MULTILAYER COATING AND AUTOMOTIVE BODY

FIELD OF THE INVENTION

The present invention relates to a clear coating for top coating of automotive bodies which has weathering resistance, acid resistance and car wash-free excellent stain resistance and is also excellent in stain resistance in polished surface sections, to a method of forming a multilayer coating film on automotive bodies using the same and to an automotive body.

PRIOR ART

A clear coating for top coating for automobiles is required to have decorativeness, weathering resistance and like qualities as key performance characteristics in addition to the minimum requirement to be met by any coating, namely storage stability, since that composition constitutes the outermost layer of coating films on automotive bodies. In recent years, it has been found that the melamine resin curing agent occurring in such coating films is causative of etching by acid rain and, for providing acid resistance to prevent such etching, the development of curing systems other than the melamine curing system has been awaited.

In Japanese Kokai Publication Hei-02-45577, Japanese Kokai Publication Hei-03-287650, Japanese Kokoku Publication Hei-06-41576 and Japanese Kokai Publication Hei-08-259667, there are disclosed coating compositions in which no melamine resin curing agents are used. These coating compositions make use of ester linkages formed by the reaction between an acid group and an epoxy group as crosslinking sites and therefore provide good acid resistance. In these curing systems (hereinafter referred to as "acid-epoxy curing systems"), hard and fragile coating films are readily formed when the crosslink density is increased to thereby provide coating films with sufficient weathering resistance and, further, the problem concerning stain resistance, namely the ease of stains being washed off, when causing deposits of contaminants such as soot and dust, has not been studied or solved.

In Japanese Kokai Publication Hei-10-140077, there is disclosed a top coating for automobiles which comprises an acid/epoxy-curable coating with a low condensate (low silicate condensate), with a degree of condensation of 2 to 10, of tetramethyl silicate and/or tetraethyl silicate as incorporated therein. This technology is to solve the problems mentioned above about stain resistance. This technology contrives to retain the reactivity with water by restricting the number of carbon atoms in the alkoxyl group and thus using a low condensate of tetramethyl silicate and/or tetraethyl silicate. And, the basic principle thereof is to cause coating films obtained from this coating to show high hydrophilicity resulting from the hydroxyl groups formed by the reaction of methoxy or ethoxy groups of the low silicate condensate as occurring in large amounts in the vicinity of the surface of the coating films with water upon exposure or treatment with an acid and thus show stain resistance.

In an automobile coating line, however, there is a finishing step in which the coated surface after top coating is polished with a #2400 and/or #4000 sandpaper, following removal of dust, grains, when such or other grains are found on that surface.

Those sections of the coating films polished in the above manner show decreased stain resistance due to the disappearance of hydrophilicity resulting from polishing off of the silicate-rich layer in the vicinity of the coating film surface. Therefore, when the whole automotive coating is viewed, there occur sections differing in hydrophilicity level, hence markedly differing in stain resistance level. Thus, there arises the problem of black and white spotted pattern formation upon exposure.

Further, automotive coatings are washed with water by the user to remove stains and, where necessary, further treated with wax. In the case of luxury cars, there is a tendency toward preference for waxing from the decorativeness viewpoint or for the purpose of polishing. In the case of cars of practical use, for example cars for commercial use, if coating films having sufficient hydrophilicity to provide the so-called car wash-freeness, namely a property such that surface stains can be washed off by rainwater or the like without particularly removing stains by washing with water, can be formed, the user will be no more required to waste time and labor for car washing.

SUMMARY OF THE INVENTION

In view of the above-mentioned state of the art, it is an object of the present invention to provide a clear coating for top coating of automobiles which has basic performance characteristics such as weathering resistance, acid resistance and car wash-free stain resistance as well as good stain resistance in polished surface sections, a method of forming a multilayer coating film on automotive bodies, and an automotive body having such a coating.

The present invention provides a clear coating for top coating of automobiles
which comprises a half-esterified acid group-containing acrylic copolymer (I) and a silicate-grafted acrylic copolymer (II) as resin constituents,
said half-esterified acid group-containing acrylic copolymer (I) being obtainable by:
preparing a copolymer from an acid anhydride group-containing, radical-polymerizable monomer (I-a) and another radical-polymerizable monomer (I-b) and then half-esterifying said acid anhydride group with a low-molecular alcohol compound,
said silicate-grafted copolymer (II) being obtainable by grafting a silicate compound (II-B) onto a hydrolyzable silyl-containing copolymer (II-A),
said silicate compound (II-B) being represented by the general formula (1):

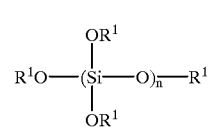

$$(1)$$

wherein n represents an integer of 1 to 50 and the $R^1$ groups may represent different groups and each represents a substituted or unsubstituted organic group containing 1 to 20 carbon atoms, and
the amount of said silicate compound (II-B) grafted being 5 to 50% by mass (on solids basis) relative to the total amount of the above resin constituents.

The invention also provides a clear coating for top coating of automobiles
wherein the above hydrolyzable silyl-containing copolymer (II-A) is an acrylic copolymer obtainable by copolymerizing a hydrolyzable silyl-containing, radical-polymerizable monomer (II-A-a) and a hydroxyl-containing, radical-polymerizable monomer (II-A-b).

The invention further provides a process for forming a multilayer coating film on automotive bodies
which comprises forming an undercoat film layer on an automotive panel,
then applying a base coating containing a color pigment and/or a luster pigment
and applying a clear coating for top coating thereonto by the wet-on-wet technique, followed by heating for curing,
said clear coating for top coating being the above-mentioned clear coating for top coating of automobiles.

The invention further provides a method of forming a multilayer coating film on automotive bodies
which comprises:
forming an undercoat film layer on an automotive panel,
applying thereonto a solid color coating containing a color pigment, heating the same for curing , or applying to the outside panel a base coating and a clear coating by the wet-on-wet technique, heating the same for curing,
applying thereonto a clear coating for top coating by the dry-on-wet technique
and heating the same for curing,
said clear coating for top coating being the above-mentioned clear coating for top coating of automobiles.

The invention still further provides an automotive body coated with a multilayer coating film,
the outermost layer of said multilayer coating film being formed from the above-mentioned clear coating for top coating of automotive bodies.

In the following, the invention is described in detail.

DETAILED DESCRIPTION OF THE INVENTION

The clear coating of the invention for top coating of automobiles comprises the half-esterified acid group-containing acrylic copolymer (I) and the silicate-grafted polymer (II) as resin constituents. The half-esterified acid group-containing acrylic copolymer (I) is obtainable by preparing a copolymer from an acid anhydride group-containing, radical-polymerizable monomer (I-a) and another radical-polymerizable monomer (I-b) and then half-esterifying the acid anhydride group with a low-molecular alcohol compound.

The acid anhydride group-containing, radical-polymerizable monomer (I-a) is not particularly restricted but may be any of radical-polymerizable monomers having an acid anhydride group for providing the half-esterified acid group-containing acrylic copolymer (I). For example, there may be mentioned itaconic anhydride, maleic anhydride, citraconic anhydride and the like. These may be used singly or two or more of them may be used in combination.

The other radical-polymerizable monomer (I-b) is not particularly restricted but includes, among others, styrenics such as styrene and α-methylstyrene; acrylate esters such as methyl acrylate, ethyl acrylate, propyl acrylate, n-, iso- and tert-butyl acrylate, 2-ethylhexyl acrylate and lauryl acrylate; methacrylate esters such as methyl methacrylate, ethyl methacrylate, propyl methacrylate, n-, iso- and tert-butyl methacrylate, 2-ethylhexyl methacrylate and lauryl methacrylate; amides such as acrylamide and methacrylamide, and so forth. These may be used singly or two or more of them may be used in combination.

The comonomer composition in preparing a copolymer from the acid anhydride group-containing, radical-polymerizable monomer (I-a) and the other radical-polymerizable monomer (I-b) is preferably such that the acid anhydride group-containing, radical-polymerizable monomer (I-a) accounts for 10 to 40% by mass, in particular 15 to 30% by mass, relative to the total mass of the monomers.

The half-esterified acid group-containing acrylic copolymer (I) is obtained by copolymerizing the above radical-polymerizable monomers using a radical polymerization initiator. The method of the copolymerization is not particularly restricted but the copolymerization can be carried out in the manner of ordinary radical polymerization or like solution polymerization, for example at a polymerization temperature of 100 to 140° C. for a polymerization period of 3 to 8 hours.

The radical polymerization initiator is not particularly restricted but includes, among others, tert-butyl peroxy-2-ethylhexanoate, dimethyl 2,2'-azobisisobutyrate and the like. These may be used singly or two or more of them may be used in combination. The radical polymerization initiator is used preferably in an amount of 3 to 15% by mass relative to the total amount of the monomers mentioned above. In carrying out the above copolymerization, a chain transfer agent and/or like additives may be added.

The above copolymer preferably has a number average molecular weight (Mn) of 500 to 10,000, in particular 1,000 to 8,000. When the number average molecular weight (Mn) is less than 500, the curability of the coating is insufficient and, when it exceeds 10,000, the viscosity of the copolymer becomes high and it becomes difficult to formulate high-solid heat-curable coatings. In the present specification, the number average molecular weight (Mn) is a number average molecular weight determined by GPC (gel permeation chromatography) and expressed on the polystyrene equivalent basis.

The above copolymer contains at least two acid anhydride groups in each molecule. When the number thereof is less than 2, the copolymer has a drawback in that the curability is insufficient. Preferably, the number is 2 to 15.

The half-esterification is carried out after preparation of the above copolymer. The half-esterifying agent to be used for the above half esterification of the acid anhydride groups is not particularly restricted but may be any low-molecular alcohol compound. Its molecular weight is preferably not greater than 200, more preferably not greater than 150. It includes, among others, methanol, ethanol, n-propanol, isopropanol, n-butanol, isobutanol, tert-butanol, methylcellosolve, ethylcellosolve, dimethylaminoethanol, diethylaminoethanol, acetol, allyl alcohol, propargyl alcohol and the like. These may be used singly or two or more of them may be used in combination. Particularly preferred compounds among these are acetol, allyl alcohol, propargyl alcohol and methanol.

The reaction method for the above half esterification is not particularly restricted but, for example, the reaction can be carried out in the conventional manner at a temperature from room temperature to 120° C. in the presence of a catalyst. The catalyst is not particularly restricted but includes, among others, tertiary amines such as triethylamine and tributylamine; quaternary ammonium salts such as benzyltrimethylammonium chloride, benzyltrimethylammonium bromide, benzyltributylammonium chloride and benzyltributylammonium bromide, and the like. These may be used singly or two or more of them may be used in combination.

In addition to the half-esterified acid group-containing acrylic copolymer (I), there may also be added, as another coating film-forming resin, a carboxyl-containing polyester resin obtained by half-esterifying, with an acid anhydride group-containing compound, a polyester polyol obtained by allowing a lactone compound such as ε-caprolactone to add to a low-molecular polyhydric alcohol in the manner of chain extension reaction.

The above carboxyl-containing polyester resin shows a sharp molecular weight distribution and, therefore, by using the carboxyl-containing polyester resin, it becomes possible to allow the clear coating for top coating of automobiles to have a high solids content and thereby provide coating films excellent in weathering resistance and water resistance.

The above low-molecular polyhydric alcohol is not particularly restricted but includes, as preferred examples, those having at least 3 hydroxyl groups in each molecule, such as trimethylolpropane, trimethylolethane, 1,2,4-butanetriol, ditrimethylolpropane, pentaerythritol, dipentaerythritol, glycerol and the like. These may be used singly or two or more of them may be used in combination.

The above lactone compound may be any cyclic compound capable of reacting with a nucleophilic reagent and thus undergoing ring opening owing to its having an intraannular oxygen atom to give a terminal hydroxyl group. The above lactone compound preferably contains 4 to 7 carbon atoms because of ready susceptibility to the ring opening addition reaction.

The above lactone compound is not particularly restricted but includes, among others, ε-caprolactone, γ-caprolactone, γ-valerolactone, δ-valerolactone, γ-butyrolactone and the like. These may be used singly or two or more of them may be used in combination. Among them, ε-caprolactone, γ-valerolactone and γ-butyrolactone are preferred.

The above chain extension reaction can be carried out under the same conditions as in ordinary ring opening addition reactions. For example, the above polyester polyol resulting from chain extension of the above low-molecular alcohol can be obtained by carrying out the reaction in an appropriate solvent or without using any solvent at a temperature of 80 to 200° C. for a period not longer than 5 hours. On that occasion, a tin catalyst or the like may be used.

In carrying out the above chain extension reaction, the lactone compound is used in an amount of 0.2 to 10 moles per mole of the hydroxyl group of the low-molecular polyhydric alcohol. When the amount of the lactone compound is less than 0.2 mole per mole of the hydroxyl group of the low-molecular polyhydric alcohol, the resulting coating films become hard and the impact resistance thereof decreases. When that amount is more than 10 moles, the hardness of the coating films decreases. That amount is preferably 0.25 to 5 moles, more preferably 0.3 to 3 moles.

The above carboxyl-containing polyester resin has an acid value of 50 to 350 mg KOH/g, a number average molecular weight (Mn) of 400 to 3,500 and a weight average molecular weight (Mw) /number average molecular weight (Mn) ratio of not more than 1.8. When the acid value is less than 50, the coating will be insufficient in curability and, when the acid value is above 350, the carboxyl-containing polyester resin has an excessively high viscosity and high-solid heat-curable coatings can hardly be formulated. When the molecular weight is less than 400, the curability of the coating will be insufficient or the water resistance of the coating films will lower. When the molecular weight is above 3,500, the viscosity of the carboxyl-containing polyester resin becomes excessively high, rendering it difficult to handle the same and formulate high-solid heat-curable coatings. When the weight average molecular weight (Mw)/number average molecular weight (Mn) ratio exceeds 1.8, the water resistance and weathering resistance of the coating films will decrease.

Preferably, the acid value is 100 to 300 mg KOH/g, the number average molecular weight (Mn) is 500 to 2,500 and the weight average molecular weight (Mw)/number average molecular weight (Mn) ratio is not more than 1.5. More preferably, the acid value is 150 to 250 mg KOH/g, the number average molecular weight (Mn) is 700 to 2,000 and the weight average molecular weight (Mw)/number average molecular weight (Mn) ratio is not more than 1.35. Herein, the acid value is given on the solid basis.

The method of reacting the above polyester polyol with the above acid anhydride group-containing compound for half esterification is not particularly restricted but the reaction can be carried out, for example, in the conventional manner by contacting the above polyester polyol with the above acid anhydride group-containing compound at a temperature from room temperature to 150° C. at ordinary pressure.

The above acid anhydride group-containing compound is not particularly restricted but includes, among others, phthalic anhydride, tetrahydrophthalic anhydride, hexahydrophthalic anhydride, 4-methylhexahydrophthalic anhydride, trimellitic anhydride, succinic anhydride and the like. These may be used singly or two or more of them may be used in combination.

Generally, the above acid anhydride group-containing compound is used preferably in an amount of 0.2 to 1.0 mole, in particular 0.5 to 0.9 mole, of the acid anhydride group per mole of the hydroxyl group of the above polyester polyol. When the amount of the acid anhydride group-containing compound is less than 0.2 mole of the acid anhydride group per mole of the hydroxyl group of the polyester polyol, the curability of the coating will be insufficient.

It is not always necessary, however, that all hydroxyl groups of the above polyester polyol have been modified into carboxyl groups; some hydroxyl groups may remain. That is to say, the above carboxyl-containing polyester resin, when it contains a hydroxyl group(s), provides the coating film surface with a carboxyl group(s) and a hydroxyl group(s) simultaneously, so that, in the case of recoating, for instance, it can provide better adhesiveness as compared with the carboxyl-containing polyester resin having no hydroxyl group.

When the carboxyl-containing polyester resin has a hydroxyl group(s), the carboxyl-containing polyester resin has a hydroxyl value of not more than 150 mg KOH/g. When the hydroxyl value exceeds 150 mg KOH/g, the water resistance of the coating films will decrease. A value of 5 to 100 mg KOH/g is preferred and a value of 10 to 80 mg KOH/g is more preferred. The hydroxyl values given above are on the solid basis.

The carboxyl-containing polyester resin, when it has hydroxyl and carboxyl groups, can react with and bind to both the half-esterified acid group-containing acrylic copolymer (I) and the silicate-grafted acrylic copolymer (II) to be described in detail later herein, firmer coatings can be obtained. In this case, it preferably has not less than 0.1 hydroxyl group, on an average, per molecule.

The above carboxyl-containing polyester resin is contained in an amount of 0 to 70% by mass, preferably 5 to 70% by mass, relative to the total amount of resin constituents. When it is less than 5% by mass, high-solid heat-curable coatings can hardly be formulated. When it exceeds 70% by mass, the weathering resistance of the coating films decreases. Its content is preferably 5 to 50% by mass, more preferably 10 to 40% by mass. The % by mass values given above are on the solids basis.

The silicate-grafted acrylic copolymer (II) to be used in accordance with the invention is obtainable by grafting the silicate compound (II-B) onto the hydrolyzable silyl-containing copolymer (II-A).

The hydrolyzable silyl-containing copolymer (II-A) is an acrylic copolymer obtained by copolymerizing, as essential constituents, the hydrolyzable silyl-containing, radical-polymerizable monomer (II-A-a) and the hydroxyl-containing, radical-polymerizable monomer (II-A-b), preferably an acrylic copolymer obtained by copolymerizing 10 to 50 parts by mass of the hydrolyzable silyl-containing, radical-polymerizable monomer (II-A-a), 10 to 50 parts by mass of the hydroxyl-containing, radical-polymerizable monomer (II-A-b), 30 to 70 parts by mass of an epoxy-containing, radical-polymerizable monomer (II-A-c) and 10 to 40 parts by mass of another radical-polymerizable monomer (II-A-d) per 100 parts by mass of all the monomers.

The hydrolyzable silyl-containing, radical-polymerizable monomer (II-A-a) is represented by the general formula (2):

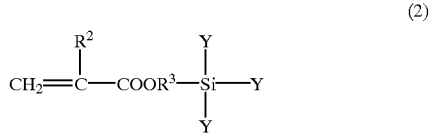

(2)

wherein $R^2$ represents a hydrogen atom or a methyl group, $R^3$ represents a hydrocarbon group containing 1 to 8 carbon atoms and Ys are the same or different and each represents a hydrogen atom, a hydroxyl group, an alkoxy group containing 1 to 4 carbon atoms, an alkyl group containing 1 to 8 carbon atoms, an aryl group or an aralkyl group, provided that at least one of the Ys represents a hydrogen atom, a hydroxyl group or an alkoxy group containing 1 to 4 carbon atoms The hydrocarbon group containing 1 to 8 carbon atoms as represented by $R^3$ includes, among others, straight or branched bivalent alkyl, alkenyl and aryl groups. The alkoxy, alkyl and aralkyl groups represented by Y may be straight or branched.

As examples of the silane group-containing monomer represented by the above general formula (2), there may be mentioned, among others, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylethoxysilane, γ-(meth)acryloxypropyltrisilanol, γ-(meth)acryloxypropylmethyldihydroxysilane, γ-(meth)acryloxybutylphenyldihydroxysilane, γ-(meth)acryloxypropyldimethylhydroxysilane, γ-(meth)acryloxypropylphenylmethylhydroxysilane, and the like.

The above hydroxyl-containing, radical-polymerizable monomer (II-A-b) is not particularly restricted but includes, among others, 2-hydroxyethyl (meth)acrylate, 4-hydroxybutyl (meth)acrylate, Placcel FM-1 (trademark, product of Daicel Chemical Industries) and the like. These may be used singly or two or more of them may be used in combination.

The above epoxy-containing, radical-polymerizable monomer (II-A-c) is not particularly restricted but includes, among others, glycidyl (meth)acrylate, 3,4-epoxycyclohexanylmethyl methacrylate and the like. These may be used singly or two or more of them may be used in combination.

The other radical-polymerizable monomer (II-A-d) is not particularly restricted but includes, among others, the same ones as mentioned above referring to the other radical-polymerizable monomer (I-b).

The hydrolyzable silyl-containing copolymer (II-A) is obtained by copolymerizing the above radical-polymerizable monomers using a radical polymerization initiator. The method of the copolymerization is not particularly restricted but the copolymerization can be carried out in the manner of ordinary radical polymerization or like solution polymerization, for example at a polymerization temperature of 100 to 140° C. for a polymerization period of 3 to 8 hours.

The radical polymerization initiator is not particularly restricted but includes, among others, tert-butyl peroxy-2-ethylhexanoate, dimethyl 2,2'-azobisisobutyrate and the like. These may be used singly or two or more of them may be used in combination. The radical polymerization initiator is used preferably in an amount of 3 to 15% by mass relative to the total amount of the monomers mentioned above. In carrying out the above copolymerization, a chain transfer agent and/or like additives may be added.

The hydrolyzable silyl-containing copolymer (II-A) has a number average molecular weight (Mn) of 1,000 to 8,000 and has 1 to 15 hydrolyzable silyl groups and 1 to 12 hydroxyl groups in each molecule. It has a hydroxyl value of 5 to 200 mg KOH/g. When the hydrolyzable silyl-containing copolymer (II-A) has a number average molecular weight (Mn) of less than 1,000, the performance and weathering resistance of the coating films will be poor. When it exceeds 8,000, the compatibility with the silicate compound (II-B) decreases and the grafting will not proceed. When each molecule has less than one hydrolyzable silyl group, the grafting of the silicate compound (II-B) will not proceed, hence the polished sections on the coating films obtained will show decreased stain resistance. When more than 15 groups occur, the cured coating film obtained may be excessively hard and the weathering resistance will possibly be poor. When the hydroxyl value is less than 5 mg KOH/g, the adhesiveness will be poor and, when it exceeds 200 mg KOH/g, the cured coating films obtained will show insufficient water resistance.

More preferably, it has 2 to 10 epoxy groups per molecule and has an epoxy equivalent of 100 to 800. When the epoxy equivalent is less than 100, the cured coating films become excessively hard and show poor weathering resistance and, when it exceeds 800, the curability of the coating becomes insufficient. Most preferably, it has 4 to 10 hydroxyl groups and 3 to 8 epoxy groups per molecule and has a hydroxyl value of 10 to 150 mg KOH/g and an epoxy equivalent of 200 to 600. The hydroxyl value and epoxy equivalent are given herein on the solids basis.

The above silicate compound (II-B) is represented by the general formula (1):

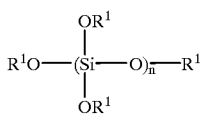

(1)

In the above general formula (1), n represents an integer of 1 to 50, preferably 1 to 30. The $R^1$ groups may be same or different and each represents a substituted or unsubstituted organic group containing 1 to 20 carbon atoms. When n exceeds 50, the viscosity of the copolymer obtained by grafting the silicate compound (II-B) becomes high and the copolymer hardly develop onto the coating film surface. For the copolymer obtained by grafting the silicate compound (II-B) to have an adequate viscosity, n is preferably 5 to 30, more preferably 10 to 20.

The substituted or unsubstituted organic group containing 1 to 20 carbon atoms is to make it easy for the polymer obtained by grafting the silicate compound (II-B) to develop onto the coating film surface in the wet coating film and thus occur abundantly in the vicinity of the coating film surface in the step of coating. Thus, for appropriately reducing the compatibility with the other resin constituents, those groups containing 1 to 10 carbon atoms are preferred.

The above substituted or unsubstituted organic group containing 1 to 20 carbon atoms is not particularly restricted but includes, among others, substituted or unsubstituted alkyl, cycloalkyl, aryl, aralkyl and like substituted or unsubstituted groups containing 1 to 20 carbon atoms. As the substituent(s), there may be mentioned alkoxyl groups containing not more than 6 carbon atoms. Among them, substituted or unsubstituted alkyl and aralkyl groups containing 1 to 20 carbon atoms are preferred.

The above alkyl groups are not particularly restricted but include straight and branched ones, such as methyl, ethyl, propyl, isopropyl, n-butyl, sec-butyl, tert-butyl, n-amyl, isoamyl, neoamyl, hexyl, heptyl, octyl, 2-ethylhexyl, etc. Among them, methyl, ethyl, propyl, isopropyl and n-butyl groups are preferred.

The above cycloalkyl groups are not particularly restricted but include, among others, cyclopentyl and cyclohexyl. The aryl groups are not particularly restricted but include, among others, phenyl, tolyl, xylyl, etc.

The above aralkyl groups are not particularly restricted but include, among others, benzyl; alkyl-substituted benzyl groups such as 2-methylbenzyl, 3-methylbenzyl, 4-methylbenzyl, dimethylbenzyl, 3,4,5-trimethylbenzyl, 4-ethylbenzyl, 4-isopropylbenzyl, 4-butylbenzyl and 4-tert-butylbenzyl; alkoxy-substituted benzyl groups such as dimethoxybenzyl, 2-ethoxybenzyl, 3-ethoxybenzyl, 4-ethoxybenzyl, 4-butoxybenzyl, 2-methoxybenzyl, 3-methoxybenzyl and 4-methoxybenzyl; phenethyl, benzoin group, phenylpropyl and like benzyl and like phenethyl groups. Among them, benzyl, methylbenzyl, ethylbenzyl and methoxybenzyl are preferred.

From the sufficient coating film hydrophilicity manifestation viewpoint, the whole or part of the above substituted or unsubstituted organic group containing 1 to 20 carbon atoms preferably comprises methyl, ethyl and/or propyl. Among these, methyl is most preferred.

From the viewpoint of the sufficient storage stability, it is preferred that the above organic group partly comprise methyl.

As specific examples of the silicate compound (II-B), there may be mentioned tetramethoxysilane, tetraethoxysilane, tetra-n-propoxysilane, tetraisopropoxysilane, tetra-n-butoxysilane, tetra-sec-butoxysilane, tetra-tert-butoxysilane, tetra-n-pentoxysilane, tetraisopentoxysilane, tetraneopentoxysilane and the like; and condensation products derived from one or two or more of them.

As the silicate compound (II-B), there may also be mentioned alcohol exchange products derived from methyl silicate and/or a condensate(s) thereof as represented by the general formula (3) given below or ethyl silicate and/or a condensate(s) thereof as represented by the general formula (4) given below as a reaction substrate.

In that case, the silicate compound (II-B) occurs as an alcohol-modified silicate compound resulting from partial modification of the methyl or ethyl groups of methyl silicate and/or a condensate(s) thereof or ethyl silicate and/or a condensate(s) thereof by the alcohol exchange reaction.

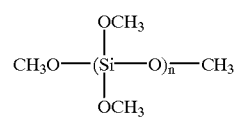

(3)

In the above formula, n is as defined above.

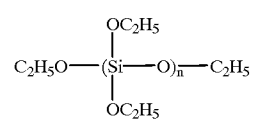

(4)

In the above formula, n is as defined above.

The above methyl silicate and/or condensates are not particularly restricted but include commercial products such as "MKC Silicate MS-51" (n=5 on average), "MKC Silicate MS-56" (n=10 on average) and "MKC Silicate MS-60" (n=20 on average) (all trademarks, products of Mitsubishi Chemical) and the like.

The above ethyl silicate and/or condensates are not particularly restricted but include commercial products such as "Ethyl Silicate 40", "Ethyl Silicate 48" and "Ethyl Silicate 28" (all trademarks, products of Colcoat Co.) and the like.

The above alcohol exchange reaction is carried out by reacting the above methyl silicate and/or condensate(s) or ethyl silicate and/or condensate(s) as a reaction substrate with an alcohol compound as a nucleophilic reagent.

The above alcohol compound includes substituted or unsubstituted alkyl alcohol compounds containing 1 to 20 carbon atoms and substituted or unsubstituted aralkyl alcohol compounds containing 7 to 20 carbon atoms. These may be used singly or two or more of them may be used in combination.

The substituted or unsubstituted alkyl alcohol compounds containing 1 to 20 carbon atoms are not particularly restricted but include, among others, alkyl alcohol compounds such as methyl alcohol, ethyl alcohol, propyl alcohol, isopropyl alcohol, n-butyl alcohol, sec-butyl alcohol, tert-butyl alcohol, n-amyl alcohol, isoamyl alcohol, hexyl alcohol, heptyl alcohol, octyl alcohol and 2-ethylhexyl alcohol; ether alcohol compounds such as methyl Cellosolve, ethyl Cellosolve, butyl Cellosolve, hexyl Cellosolve and butyl diglycol, and the like. These may be used singly or two or more of them may be used in combination.

The substituted or unsubstituted aralkyl alcohol compounds containing 7 to 20 carbon atoms are not particularly restricted but include, among others, benzyl alcohol;

halobenzyl alcohols such as 2-chlorobenzyl alcohol, 3-chlorobenzyl alcohol, 4-chlorobenzyl alcohol, 2-bromobenzyl alcohol, 3-bromobenzyl alcohol, 4-bromobenzyl alcohol, 2-iodobenzyl alcohol, 3-iodobenzyl alcohol, 4-iodobenzyl alcohol and dichlorobenzyl alcohol; alkyl-substituted benzyl alcohols such as 2-methylbenzyl alcohol, 3-methylbenzyl alcohol, 4-methylbenzyl alcohol, dimethylbenzyl alcohol, 3,4,5-trimethylbenzyl alcohol, 4-ethylbenzyl alcohol, 4-isopropylbenzyl alcohol, 4-butylbenzyl alcohol and 4-tert-butylbenzyl alcohol; alkoxy-substituted benzyl alcohols such as dimethoxybenzyl alcohol, 2-ethoxybenzyl alcohol, 3-ethoxybenzyl alcohol, 4-ethoxybenzyl alcohol, 4-butoxybenzyl alcohol, 2-methoxybenzyl alcohol, 3-methoxybenzyl alcohol and 4-methoxybenzyl alcohol; phenethyl alcohol, benzoin, phenylpropanol and like benzyl and like phenethyl alcohols. These may used singly or two or more of them may be used in combination.

In effecting the above alcohol exchange reaction, an alcohol exchange catalyst may be used. The alcohol exchange catalyst is not particularly restricted but may be an acid or a base, for instance. The acid is not particularly restricted but includes, among others, BrØnsted acids such as hydrochloric acid, sulfuric acid, phosphoric acid and sulfonic acids; and Lewis acids such as organotin compounds. The base is not particularly restricted but includes, among others, tertiary amines such as triethylamine, diisopropylethylamine, dimethylbenzylamine, diazabicyclo[2.2.2]octane and 1,8-diazabicyclo[5.4.0]undecene-7. These may used singly or two or more of them may be used in combination.

It is not necessary to use a particular solvent in the above alcohol exchange reaction. For example, the alcohol compound, which is the nucleophilic reagent, may be used as a solvent in excess relative to the reaction substrate.

The solvent is not particularly restricted but includes, among others, aromatic hydrocarbons such as toluene, benzene and xylene; halogenated hydrocarbons such as dichloroethane; ethers such as THF and dioxane; ketones such as methyl ethyl ketone and methyl isobutyl ketone; esters such as ethyl acetate and butyl acetate; dimethyl carbonate, acetonitrile and so on. These may be used singly or two or more of them may be used in combination.

The amount of the solvent is not particularly restricted but preferably is not more than 10 times, for instance, the total weight of the reaction substrate methyl silicate and/or condensate(s) thereof or ethyl silicate and/or condensate(s) thereof and the reaction reagent alcohol compound.

The ratio between the reaction substrate methyl silicate and/or condensate(s) thereof or ethyl silicate and/or condensate(s) thereof and the reaction reagent alcohol compound in the alcohol exchange reaction is not particularly restricted but may be, for example, such that the alcohol compound amounts to at least 1 mole percent relative to the reaction substrate and at least sufficient for the intended modification.

The above alcohol exchange reaction may be carried out while azeotropically distilling off the methanol or ethanol formed upon modification.

The reaction conditions for the alcohol exchange reaction are not particularly restricted but the reaction temperature is generally 0° C. to 200° C. The reaction time is preferably not longer than 24 hours. The pressure during the reaction is generally atmospheric, but the reaction may be carried out under reduced pressure so that the byproduct methanol or ethanol may be distilled off.

The conversion rate in the alcohol exchange reaction can be checked by measuring the amount of the methanol formed, NMR spectrometry, or GC (gas chromatography), for instance. The product obtained in the above manner generally occurs as a colorless to light-yellow oily substance.

The silicate compound (II-B) can be obtained not only by the alcohol exchange reaction, as mentioned above, but also by another production method, for example by the method comprising copolymerizing a polymerizable polysiloxane compound or a silane compound having chain transfer capacity with a monofunctional monomer.

From the coating film hydrophilicity manifestation viewpoint, methyl silicate condensates are most preferred as the silicate compound (II-B).

The method of effecting the grafting reaction is not particularly restricted but the reaction may be carried out on the conventional manner, for example without using any solvent or in an organic solvent.

The organic solvent is not particularly restricted but includes, among others, esters such as ethyl acetate and butyl acetate; ketones such as acetone and methyl ethyl ketone; ethers such as tetrahydrofuran and dioxane; aromatic hydrocarbons such as toluene, xylene and Solvesso 100 (aromatic hydrocarbon solvent, product of Esso).

Although the reaction temperature and time in the above grafting reaction may vary depending on the raw material species, the reaction is generally carried out at room temperature to 150° C. preferably within 24 hours. A reaction temperature lower than room temperature will not allow the silicate compound (II-B) to be grafted to a sufficient extent. A temperature above 150° C. or a longer time than 24 hours will allow molecules of the silicate compound (II-B) to condense with one another.

The amount of the silicate compound (II-B) to be grafted is 5 to 50% by mass as the silicate compound (II-B) relative to the total amount of the resin constituents mentioned above. The amount of the silicate compound (II-B) is less than 5% by mass, the coating film hydrophilicity manifestation is not sufficient, hence the stain resistance, in particular in polished sections, will be poor. When it exceeds 50% by mass, the coating films may not have sufficient water resistance to maintain their good appearance. An amount of 10 to 30% by mass is preferred. The % by mass values given above are on the solids basis.

The —OR$^1$ group, in particular methoxy group, in the polymer obtained by grafting the silicate compound (II-B) tends to be converted to a hydroxyl group with the lapse of time and, therefore, the angle of contact of the coating film surface with water becomes small and thus the coating film is given hydrophilicity. Therefore, supposedly, it becomes possible for contaminants adhering to the coating film surface to be readily washed away, and the coating film manifests high stain resistance. Further, the polymer obtained by grafting the silicate compound (II-B) has an adequate level of compatibility with the other resin constituents owing to the presence of the hydrolyzable silyl group and, within the coating films formed, too, it has hydrolyzable methoxy groups and, therefore, sufficient stain resistance is manifested even on the surface of the coatings revealed upon polishing.

Furthermore, unlike the low condensates of tetramethyl silicate and/or tetraethyl silicate, the polymer obtained by grafting the silicate compound (II-B) hardly undergoes condensation reactions or reactions with other resin constituents during storage of the coating since said polymer is formed by the reaction of the most reactive alkyl groups of the silicate compound (II-B) with the hydroxyl groups of the hydroxyl-containing polymer and the most reactive portions of the silicate compound (II-B) are blocked. Thus, said coating is superior in storage stability and the coating films obtained therefrom show sufficient hydrophilicity and manifest high stain resistance stably on the coating film surface and polished sections even after storage of the coating. Further, unlike tetramethyl silicate and/or low condensates thereof, the polymer obtained by grafting the silicate compound (II-B), is excellent in compatibility with the other resin constituents in the coating and the hydrophilic groups after coating are prevented, to an appropriate extent, from localizing to the coating film surface layer, since the polymer is formed by grafting the silicate compound (II-B) onto the hydroxyl-containing polymer mentioned above. The water resistance is thus improved.

In cases where the silicate compound (II-B) is obtained by the alcohol exchange reaction, the alcohol compound, which is the reagent used in obtaining that compound, may be added, as a solvent, to the clear coating for top coating of automobiles. The addition amount of the alcohol compound is preferably 10 to 200 parts by mass per 100 parts by mass of the silicate compound (II-B). By adding the alcohol compound, the polymer obtained by grafting the silicate compound (II-B) can be stabilized during storage of the clear coating for top coating of automobiles and, further, coating film abnormalities can be prevented in the step of curing by heating.

Referring to the resin constituents in the clear coating for top coating of automobiles, the ratio [total number of hydroxyl groups in the silicate grafted acrylic copolymer (II)]/[total number of half-esterified acid anhydride groups in the half-esterified acid group-containing acrylic copolymer (I)] is preferably 0.1 to 1.5, in particular 0.3 to 1.2, and the ratio [total number of epoxy groups in the silicate-grafted acrylic copolymer (II)]/[total number of half-esterified acid anhydride groups and carboxyl groups in the half-esterified acid group-containing acrylic copolymer (I)] is preferably 0.5 to 1.5, in particular 0.6 to 1.3.

More specifically, the amount of the silicate-grafted acrylic copolymer (II) which gives such a ratio is preferably 50 to 250 parts by mass, in particular 80 to 150 parts by mass, per 100 parts by mass of the total of the half-esterified acid group-containing acrylic copolymer (I) and the other coating film-forming resins. When the amount of the silicate-grafted acrylic copolymer (II) is less than 50 parts by mass, the coating film curing becomes insufficient and the water resistance, weathering resistance and other properties of the cured coating films lower. When it exceeds 250 parts by mass, unreacted carboxyl groups remain and impair the chemical resistance.

The clear coating for top coating of automobiles generally contains a curing catalyst. The curing catalyst is not particularly restricted but may be any of those generally used in the esterification reaction (reaction between acid and epoxy), preferably quaternary ammonium salts. Specifically, there may be mentioned, in addition to the quaternary ammonium salts mentioned hereinbefore, benzyltriethylammonium chloride, benzyltriethylammonium bromide, tetrabutylammonium chloride, tetrabutylammonium bromide and the like. These may be used singly or two or more of them may be used in combination.

In the clear coating for top coating of automobiles, there may be incorporated melamine-formaldehyde resins for increasing the crosslink density and improving the water resistance, ultraviolet absorbers and/or light stabilizers for improving the weathering resistance of the coating films, microgels and/or surface modifiers for rheology controlling, diluents for viscosity adjustment, for instance, and so forth.

The ultraviolet absorber and light stabilizer are not particularly restricted but include, among others, Tinuvin 900 (product of Ciba Specialty Chemicals), Sanol LS-292 (product of Sankyo) and the like. The diluent is not particularly restricted but includes, among others, alcohol solvents such as methanol, ethanol, propanol and butanol; hydrocarbons, esters and like solvents. These may be used singly or two or more of them may be used in combination.

The curing catalyst is used preferably in an amount of 0.01 to 3.0% by mass relative to the total resin solids. The diluent is used preferably in an amount of at most 60% by mass, in particular 20 to 55% by mass, relative to the total mass of the coating diluted with the diluent.

Generally, the clear coating for top coating of automobiles does not contain any pigment. It may contain a color pigment, however, in an amount which will not impair the transparency of the coating films. The pigment is not particularly restrictedbut includes, among others, iron oxide, lead oxide, carbon black, coal dust, titanium dioxide, talc, barium sulfate, cadmium yellow, cadmium red, chrome yellow, metal pigments (e.g. aluminum flakes etc.), organic pigments (e.g. phthalocyanine blue, Cinquacia red, etc.), pearl mica and so on. These may be used singly or two or more of them may be used in combination.

The clear coating for top coating of automobiles has a solids content of 25 to 70% by mass, preferably 35 to 65% by mass. The solids content in the step of application is 15 to 65% by mass, preferably 30 to 60% by mass.

The method of preparing the clear coating for top coating of automobiles is not particularly restricted but the composition can be prepared by mixing up the constituents mentioned above using an agitator or the like. When it contains such a pigment as mentioned above, the pigment can be incorporated by kneading using a kneader, roll or the like. Further, the copolymer (II) obtained by grafting the silicate compound (II-B) may be added to and mixed with the coating prior to application or may be added to and mixed with the coating in advance in the step of producing the coating.

In cases where it is added to and mixed with the coating in advance, the resulting coating is preferably stored under such conditions that water will not enter it so that the hydrolysis and/or condensation reaction may not proceed.

The clear coating for top coating of automobiles can be applied by spray coating, brush coating, dip coating, electrostatic coating, roll coating, flow coating and other techniques.

The clear coating for top coating of automobiles gives cured coating films with a high degree of crosslinking when cured at a temperature of 100 to 180° C., preferably 120 to 160° C. Although the curing time depends on the curing temperature and other factors, a period of 10 to 30 minutes is appropriate at 120 to 160° C.

In cases where a copolymer containing simple acid anhydride groups is used in a clear coating for top coating of automobiles, the reaction thereof with active hydrogen-containing compounds proceeds even at ordinary temperature and, therefore, storing it in the same system unfavorably causes gelation. In the case of the clear coating of the invention for top coating of automobiles, no further reaction occurs with an active hydrogen-containing compound(s) and it is possible to prepare one-component formulations, since the acid anhydride groups have been modified (half-esterified). Further, as mentioned hereinbefore, the copolymer obtained by grafting the silicate compound (II-B) hardly undergoes condensation reactions or reactions with other resin constituents during storage of the coating, as mentioned hereinbefore, hence the coating is excellent in storage stability. Thus, the coating can stably develop its performance even after storage.

In the curing reaction with an active hydrogen-containing compound(s) in the step of coating film formation, it is possible to modify the rate of curing by selecting the acid anhydride group modifying agent from among various species. Thus, it is possible to form coating films outstanding in appearance.

The curing reaction in the clear coating of the invention for top coating of automobiles supposedly proceeds as follows: First, the acid anhydride-derived half-esterified, open-ring modified groups in the half-esterified acid group-containing acrylic copolymer (I) undergo ring closure again at the curing temperature to once return to acid anhydride groups. Then, the hydroxyl groups in the silicate-grated acrylic copolymer (II) react therewith to form half-ester groups again. Then, the remaining carboxyl groups in the half-esterified acid group-containing acrylic copolymer (I) react with the epoxy groups in the silicate-grafted acrylic copolymer (II) to form diester moieties. Further, the alkoxyl groups in the silicate-grafted acrylic copolymer (II) react with the hydroxyl groups in the silicate-grafted acrylic copolymer (II) under the action of the acid catalyst activity of the half-esterified acid group-containing acrylic copolymer (I). Thus, the above curing reaction presumably proceeds as a result of such mutual reactions of two or three constituents as the binding of the two group species, namely the epoxy and hydroxyl groups, in the silicate-grafted acrylic copolymer (II) to the acid anhydride modification groups, namely the carboxyl and ester groups, in the half-esterified acid group-containing acrylic copolymer (I), and the binding of the hydroxyl groups in the silicate-grafted acrylic copolymer (II) to the alkoxyl or silanol groups. Therefore, the cured coating films become firm in structure and thus excellent in weathering resistance, chemical resistance, scratch resistance, etc.

The cured coating films formed from the clear coating of the invention for top coating of automobiles is provided with hydrophilicity by reacting with an acid. Thus, the coating films may be provided with stain resistance either from the early stage by treatment with an acid beforehand or gradually with the lapse of time.

The clear coating of the invention for top coating of automobiles can be applied in a process for forming a multilayer coating film on automotive bodies which comprises forming an undercoat film layer (electrodeposition coating film layer, or an intermediate coating film layer when necessary) on an automotive panel, then applying thereonto a base coating containing a color pigment and/or a luster pigment and then applying thereonto the clear coating for top coating by the wet-on-wet technique, followed by heating for curing.

The base material to be used as the automotive panel is not particularly restricted but includes, among others, metals such as iron, copper, aluminum, tin, zinc, alloys of these and castings thereof; glass; plastics; and foamed materials. The above clear coating for top coating of automobiles can advantageously be applied to plastics and metals, more preferably to metal products coatable with a cationic electrodeposition coating. The automotive panel is not particularly restricted but includes, among others, bodies and parts of passenger cars, trucks, motorcycles, buses, etc. These metals are most preferably subjected in advance to chemical conversion treatment with a phosphate, chromate, etc.

The undercoat film layer is not particularly restricted but may be formed, for example, of an electrodeposition coating film or of an electrodeposition coating film and an intermediate coating film.

While the electrodeposition coating film can be formed by electrodeposition coating of a cationic or anionic electrodeposition coating, a cationic electrodeposition coating gives coating films superior in corrosion resistance. The cationic electrodeposition coating is a cathodic deposition type heat-curable electrodeposition coating comprising a basic amino group-containing resin as a base resin and solubilizable in water upon neutralization with an acid and it is applied to an article to be coated, which is to serve as a cathode.

The basic amino group-containing resin is not particularly restricted but is preferably derived from a bisphenol-based epoxy resin by addition of a secondary amine to the epoxy groups of the resin, for instance. The secondary amine is not particularly restricted but includes, among others, primary amines, such as diethylenetriamine, blocked by ketimine formation.

The crosslinking agent to be used in the above cationic electrodeposition coating is not particularly restricted but preferably is a blocked polyisocyanate blocked with such a blocking agent as an alcohol, phenol, oxime or lactam, for instance.

In the above electrodeposition coating, there may be incorporated one or more of pigments such as color pigments, extender pigments and rust preventive pigments, hydrophilic and/or hydrophobic solvents, additives and so on. The pigment addition amount can be 5 to 150 parts by mass per 100 parts by mass of the resin solids.

Generally and preferably, the electrodeposition coating film is formed so that the film thickness after electrodeposition coating with electrodepositing and baking/drying may amount to 10 to 40 $\mu$m, more preferably 15 to 25 $\mu$m. Prior to electrodeposition coating, the substrate is more preferably subjected to ordinary chemical conversion treatment.

The intermediate coating film is formed by applying an intermediate coating to the above electrodeposition coating film. This intermediate coating is to hide substrate defects, secure surface smoothness after top coating and provide chipping resistance. It contains one or more of various organic or inorganic color pigments and extender pigments.

The color pigment to be incorporated in the above intermediate coating is not particularly restricted but includes, among others, organic pigments such as azo chelate pigments, insoluble azo pigments, condensed azo pigments, phthalocyanine pigments, indigo pigments, perinone pigments, perylene pigments, dioxane pigments, quinacridone pigments, isoindolinone pigments and metal complex pigments; inorganic pigments such as chrome yellow, yellow iron oxide, iron oxide red, carbon black and titanium dioxide; and extender pigments such as calcium carbonate, barium sulfate, clay and talc. These may be used singly or two or more of them may be used in combination. Normally, a gray intermediate coating containing carbon black and titanium dioxide as main pigments is often used. According to the hiding power of the top coating, however, the so-called color intermediate coatings in which various color pigments are used in combination can also be used.

The heat-curable resin to be incorporated in the above intermediate coating is not particularly restricted but includes, among others, such coating film-forming resins as acrylic resins, polyester resins, alkyd resins, epoxy resins and urethane resins. These are used in combination with a curing agent such as an amino resin and/or blocked isocyanate. Among them, the combination of an alkyd resin and/or a polyester resin with an amino resin is preferred from the viewpoint of pigment dispersibility and workability.

The solids content of the intermediate coating is 30 to 70% by mass, preferably 35 to 55% by mass. In the step of application, it is 10 to 60% by mass, preferably 20 to 50% by mass.

The interdediate coating is preferably applied onto a heat-cured or uncured electrodeposition coating film by electrostatic coating, air spraying, airless spraying and other coating techniques, and an intermediate coating film is obtained by applying the above intermediate coating. This intermediate coating film itself can be cured by heating at a temperature of about 100 to 180° C. Generally, the intermediate coating film formed preferably has a dry film thickness of 10 to 60 μm, more preferably about 20 to 50 μm. When the film thickness is less than 10 μm, the substrate cannot be hidden and, when it exceeds 60 μm, such troubles as foaming and sagging may occur in the step of application.

After formation of the undercoat film layer (electrodeposition coating film layer, or an intermediate coating film layer if necessary), the above pigment-containing base coating is applied onto the undercoat film layer which is in the cured or uncured state. According to the chromaticness of the top coat color, a color base coating is preferably first applied to form a first top coat film layer in some instances. In this case, it is possible to form a multilayer coating film layer excellent in decorativeness by forming a second top coat film layer using a luster pigment-containing base coating.

The color pigment to be incorporated in the above base coating is not particularly restricted but includes, among others, the same ones as the color pigments to be incorporated in the intermediate coating. The luster pigment is not particularly restricted but includes, among others, aluminum powders, copper powders, nickel powders, stainless steel powders, mica powders, interfering mica powders, colored mica powders, aluminum flakes and graphite flakes.

The heat-curable resin to be incorporated in the above base coating is not particularly restricted but includes, among others, the same ones as the heat-curable resins to be incorporated in the intermediate coating mentioned above. Among them, the combination of an acrylic resin and/or a polyester resin with an amino resin is preferred from the viewpoint of pigment dispersibility, workability and weathering resistance.

The above base coating has a solids content of 15 to 60% by mass, preferably 20 to 55% by mass. In the step of application, it is 10 to 50% by mass, preferably 20 to 45% by mass.

The above intermediate coating and base coating both preferably are of the solution type. The solution type may be an organic solvent-based one, water-based (water-soluble, water-dispersible, emulsion) one, or nonaqueous dispersion type. If necessary, a curing catalyst, a surface modifier and/or the like may be incorporated.

When the above base coating is of the water-based type, the heat-curable resins specifically disclosed in U.S. Pat. No. 5,151,125 and U.S. Pat. No. 5,183,504 can be used as binders. In particular, the heat-curable resin which is described in U.S. Pat. No. 5,183,504 and comprises the combination of an acrylamide group-, hydroxyl group- and acid group-containing acrylic resin and a melamine resin is preferred from the finish and appearance performance viewpoint. In this case, the base coating film is preferably heated beforehand at 60 to 100° C. for 2 to 10 minutes prior to application of the clear coating film so that well-finished cured coatings can be obtained.

The above base coating is preferably applied onto the electrodeposition coating film or intermediate coating film by such a method as electrostatic coating or air spray coating. After application of the base coating, the base coating film itself can be cured by heating at about 100 to 180° C. Generally, the base coating film formed preferably has a dry film thickness of about 8 to 40 μm, more preferably about 10 to 30 μm. When the dry film thickness is less than 8 μm, the substrate cannot be hidden and, when it exceeds 40 μm, such troubles as foaming and sagging may occur in the step of application.

When the base coating film is formed by a color pigment- and/or luster pigment-containing base coating alone, it is possible to form a two-coat one-bake (2C1B) multilayer coating film by applying the clear coating for top coating by the wet-on-wet technique onto the base coating film formed and then effecting curing by heating.

In cases where the base coating film is formed by a color base coating and such a luster pigment-containing base coating as mentioned above and when the color base coating film alone is cured by heating, it is possible to form a three-coat two-bake (3C2B) multilayer coating film by applying the luster pigment-containing base coating thereonto and further applying the above-mentioned clear coating for top coating thereonto by the wet-on-wet technique, followed by curing by heating. When the color base coating film is not cured singly by heating, it is also possible to apply the luster pigment-containing base coating thereonto by the wet-on-wet technique and further apply the clear coating for top coating thereonto by the wet-on-wet technique, followed by curing by heating. Thus, it is possible to form a three-coat one-bake (3C1B) composite coating film by forming a composite coating film combinedly using the above color base coating, luster pigment-containing base coating and clear top coating by the wet-on-wet technique and then curing the composite coating film by heating. In this way, composite coating films showing more improved decorativeness can be formed.

The coating films formed from the clear coating for top coating are to secure the surface smoothness and provide other performance characteristics required of coating films, and the clear coating of the invention for top coating of automobiles is used as the above clear coating of the invention for top coating.

The above clear coating for top coating is preferably applied onto the uncured, luster pigment-containing base coating film by such a method as electrostatic coating or spray coating and, after application of the clear coating for top coating, the clear coating film itself can be cured by heating at a temperature of 100 to 200° C. to give a cured coating film. At a curing temperature of lower than 100° C., the curing is insufficient and, at above 200° C., the cured coatings become hard and fragile. Curing is preferably effected by heating at a temperature of 120 to 180° C., whereby cured coating films with a high degree of crosslinking can be formed.

While the curing time for the clear coating film depends on the curing temperature, it is judicious to effect curing at 120 to 180° C. for 10 to 30 minutes. While the dry coating film thickness of the coatings formed depends on the intended use thereof, a thickness of 10 to 80 μm is preferred in many instances and a thickness of about 15 to 60 μm is more preferred. When the dry coating film thickness is less than 10 μm, the substrate cannot be hidden. When it exceeds 80 μm, such troubles as foaming and sagging may occur in the step of application.

When the base coating is a solid color coating, the clear coating of the invention for top coating of automobiles can be applied in a process for forming a multilayer coating film on automotive bodies which comprises applying, after forming an undercoat film layer on an automotive panel, a color pigment-containing solid color coating composition thereonto, heating the same for curing and applying the clear coating for top coating by the dry-on-wet technique, followed curing by heating (2C2B).

When the base coating film is made of a color base coating alone, two-coat two-bake (2C2B) coatings can be formed by applying the color base coating, heating the same for curing and applying the clear coating for top coating thereonto by the dry-on-wet technique, followed by curing by heating.

In cases where the base coating film is formed from a luster pigment-containing base coating and an existing clear coating, three-coat two-bake (3C2B) multilayer coating films can be formed by applying the above base coating and an existing clear coating by the wet-on-wet technique and effecting curing by heating and applying the above clear coating for top coating thereonto by the dry-on-wet technique, followed by curing by heating. The existing clear coating may be any of those clear coatings for top coating of automobiles which are in conventional use.

In each case, the outermost layer coating film is formed by the one-coat one-bake (1C1B) technique.

The automotive body on which multilayer coating film has been formed using the above method of forming a multilayer coating film using the clear coating of the invention for top coating of automobiles has such basic performance characteristics as acid resistance and weathering resistance, in particular excellent acid resistance, and further has high hydrophilicity and therefore can maintain the same effect as that of maintenance-free car wash in general sections as well as in polished sections, since the outermost layer of the multilayer coating film is formed from the clear coating of the invention for top coating of automobiles. Such automotive body, too, falls within the scope of one aspect of the present invention. The clear coating of the invention can be used also as a clear coating for top coating for aluminum wheels.

The clear coating of the invention for top coating of automobiles has the constitution illustrated above and, therefore, the cured coating films obtained therefrom have a high crosslink density and therefore are excellent in weathering resistance, in particular in acid resistance. The coating film surfaces in normal sections and in polished sections have high hydrophilicity and can maintain their car wash-free decorativeness and shows good water resistance while the coating is excellent in storage stability.

The process of the invention for forming a multilayer coating film on automotive bodies can form a composite coating film excellent in appearance and coating film performance characteristics.

The automotive body of the invention is excellent in appearance and coating film performance characteristics and can be maintenance-free without requiring car washing.

EXAMPLES

The following examples illustrate the invention in further detail. They are, however, by no means limitative of the scope of the invention.

Synthesis Example 1

Half Esterified Acid Group-containing Acrylic Copolymer (a)

A 3-liter reaction vessel equipped with a thermometer, stirrer, condenser, nitrogen inlet tube and dropping funnel was charged with 330 mass parts of xylene and 110 mass parts of propylene glycol monomethyl ether acetate, and the temperature was raised to 127° C. To this reaction vessel was added dropwise, using the dropping funnel, over 3 hours a solution composed of 300 mass parts of styrene, 360 mass parts of 2-ethylhexyl methacrylate, 112 mass parts of isobutyl acrylate, 26 mass parts of acrylic acid, 202 mass parts of maleic anhydride, 300 mass parts of propylene glycol monomethyl ether acetate, 90 mass parts of tert-butyl peroxy-2-ethylhexanoate and 100 mass parts of xylene. Thereafter, the mixture was maintained at 127° C. for 30 minutes and, then, a solution composed of 10 mass parts of tert-butyl peroxy-2-ethylhexanoate and 50 mass parts of xylene was added dropwise over 30 minutes. After this addition, the reaction was further allowed to proceed at 127° C. for 1 hour. A varnish with a nonvolatile matter content of 53% was obtained which contained an acrylic poly acid anhydride (a) having a number average molecular weight (Mn) of 3,000.

To 1990 mass parts of the varnish obtained was added 100 mass parts of methanol, and the reaction was allowed to proceed at 70° C. for 23 hours to give a varnish containing a half-esterified acid group-containing acrylic copolymer (a) with an acid value of 127 mg KOH/g (on solids basis). This half-esterified acid group-containing acrylic copolymer (a) was subjected to infrared absorption spectrometry and the disappearance of the acid anhydride-due absorption (1785 cm$^{-1}$) was confirmed.

Synthesis Example 2

Carboxyl-containing Polyester Resin (b)

A reaction vessel equipped with a thermometer, stirrer, condenser, nitrogen inlet tube, water trap and rectifying column was charged with 136 mass parts of pentaerythritol, 456 mass parts of ε-caprolactone and 0.1 mass part of dibutyltin oxide, and the temperature was raised to 170° C. and maintained at 170° C. for 3 hours. Thereafter, 539 mass parts of hexahydrophthalic anhydride melted by warming was added, the mixture was maintained at 150° C. for 1 hour and then 464 mass 30 parts of ethyl 3-ethoxypropionate was added to give a varnish with a nonvolatile matter content of 71% which contained a carboxyl-containing polyester resin (b) having a number average molecular weight (Mn) of 1,700, a weight average molecular weight (Mw)/number average molecular weight (Mn) ratio of 1.28, an acid value of 174 mg KOH/g (on solids basis) and a hydroxyl value of 25 mg KOH/g (on solids basis).

Synthesis Example 3

Hydrolyzable Silyl-containing Copolymer (c)

A 2-liter reaction vessel equipped with a thermometer, stirrer, condenser, nitrogen inlet tube and dropping funnel was charged with 546 mass parts of Solvesso 100 and 53 mass parts of propylene glycol monomethyl ether acetate, and the temperature was raised to 125° C. To this reaction vessel was added dropwise, using the dropping funnel, over 3 hours a solution composed of 398 mass parts of glycidyl methacrylate, 210 mass parts of styrene, 202 mass parts of isobutyl methacrylate, 105 mass parts of γ-methacryloxypropyltrimethoxysilane, 135 mass parts of 4-hydroxybutyl acrylate, 115 mass parts of tert-butyl peroxy-2-ethylhexanoate and 115 mass parts of Solvesso 100. Thereafter, the temperature was maintained at 125° C. for 30 minutes and, then, a solution composed of 10 mass parts of tert-butyl peroxy-2-ethylhexanoate and 20 mass parts of Solvesso 100 was added dropwise over 30 minutes. After this dripping, the reaction was further allowed to proceed at 125° C. for 1 hour to give a varnish with a nonvolatile matter content of 59% which contained a hydrolyzable silyl-containing copolymer (c) having a number average molecular weight of 3,700, an epoxy equivalent of 374 (on solids basis) and a hydroxyl value of 50 mg KOH/g (on solids basis).

Synthesis Example 4

Hydrolyzable Silyl-containing Copolymer (d)

A one-liter reaction vessel equipped with a thermometer, stirrer, condenser, nitrogen inlet tube and dropping funnel was charged with 260 mass parts of Solvesso 100 and 25 mass parts of propylene glycol monomethyl ether acetate, and the temperature was raised to 125° C. To this reaction vessel was added dropwise, using the dropping funnel, over 3 hours a solution composed of 190 mass parts of glycidyl methacrylate, 100 mass parts of styrene, 46 mass parts of isobutyl methacrylate, 100 mass parts of γ-methacryloxypropyltrimethoxysilane, 64 mass parts of 4-hydroxybutyl acrylate, 55 mass parts of tert-butyl peroxy-2-ethylhexanoate and 55mass parts of Solvesso 100. Thereafter, the temperature was maintained at 125° C. for 30 minutes and, then, a solution composed of 5 mass parts of tert-butyl peroxy-2-ethylhexanoate and 10 mass parts of Solvesso 100 was added dropwise over 30 minutes. After this dripping, the reaction was further allowed to proceed at 125° C. for 1 hour to give a varnish with a nonvolatile matter content of 59% which contained a hydrolyzable silyl-containing copolymer (d) having a number average molecular weight of 3,200, an epoxy equivalent of 374 (on solids basis) and a hydroxyl value of 50 mg KOH/g (on solids basis)

Synthesis Example 5

Hydrolyzable Silyl-containing Copolymer (e)

A 2-liter reaction vessel equipped with a thermometer, stirrer, condenser, nitrogen inlet tube and dropping funnel was charged with 250 mass parts of xylene and 320 mass parts of butyl acetate, and the temperature was raised to 125° C. To this reaction vessel was added dropwise, using the dropping funnel, over 3 hours a solution composed of 380 mass parts of glycidyl methacrylate, 200 mass parts of styrene, 292 mass parts of γ-methacryloxypropyltriethoxysilane, 128 mass parts of 4-hydroxybutyl acrylate, 110 mass parts of tert-butyl peroxy-2-ethylhexanoate and 110 mass parts of butyl acetate. Thereafter, the temperature was maintained at 125° C. for 30 minutes and, then, a solution composed of 10 mass parts of tert-butyl peroxy-2-ethylhexanoate and 20 mass parts of butyl acetate was added dropwise over 30minutes. After this dripping, the reaction was further allowed to proceed at 125° C. for 1 hour to give a varnish with a nonvolatile matter content of 58% which contained a hydrolyzable silyl-containing copolymer (e) having a number average molecular weight of 3,000, an epoxy equivalent of 374 (on solids basis) and a hydroxyl value of 50 mg KOH/g (on solids basis).

Synthesis Example 6

Hydrolyzable Silyl-containing Copolymer

A one-liter reaction vessel equipped with a thermometer, stirrer, condenser, nitrogen inlet tube and dropping funnel was charged with 125 mass parts of Solvesso 100, 135 mass parts of butyl acetate and 25 mass parts of propylene glycol monomethyl ether acetate, and the temperature was raised to 125° C. To this reaction vessel was added dropwise, using the dropping funnel, over 3 hours a solution composed of 190 mass parts of glycidyl methacrylate, 100 mass parts of styrene, 146 mass parts of γ-methacryloxypropyltrimethoxysilane, 64 mass parts of 4-hydroxybutyl acrylate, 55 mass parts of tert-butyl peroxy-2-ethylhexanoate and 55 mass parts of butyl acetate. Thereafter, the temperature was maintained at 125° C. for 30 minutes and, then, a solution composed of 5 mass parts of tert-butyl peroxy-2-ethylhexanoate and 10 mass parts of butyl acetate was added dropwise over 30minutes. After this dripping, the reaction was further allowed to proceed at 125° C. for 1 hour to give a varnish with a nonvolatile matter content of 59% which contained a hydrolyzable silyl-containing copolymer (f) having a number average molecular weight of 3,300, an epoxy equivalent of 374 (on solids basis) and a hydroxyl value of 50 mg KOH/g (on solids basis).

Synthesis Example 7

Silicate-grafted Acrylic Copolymer (g)

A one-liter reaction vessel equipped with a thermometer, stirrer, condenser and nitrogen inlet tube was purged with nitrogen gas and then charged with 44 mass parts of MKC Silicate MS-60 (product of Mitsubishi Chemical) as a silicate compound, 204 mass parts of the hydrolyzable silyl-containing acrylic copolymer (c) obtained in Synthesis Example 3 and 5 mass parts of trimethyl orthoacetate, and the grafting reaction was allowed to proceed at 110° C. for 5 hours to give a varnish with a nonvolatile matter content of 65% which contained a silicate-grafted acrylic copolymer (g), namely a hydrolyzable silyl-containing acrylic copolymer obtained by grafting the silicate compound.

Synthesis Example 8

Silicate-grafted Acrylic Copolymer (h)

A one-liter reaction vessel equipped with a thermometer, stirrer, condenser and nitrogen inlet tube was purged with nitrogen gas and then charged with 80 mass parts of MKC Silicate MS-56 (product of Mitsubishi Chemical) as a silicate compound, 366 mass parts of the hydrolyzable silyl-containing acrylic copolymer (d) obtained in Synthesis Example 4 and 5 mass parts of trimethyl orthoacetate, and the grafting reaction was allowed to proceed at 120° C. for 2 hours to give a varnish with a nonvolatile matter content of 62% which contained a silicate-grafted acrylic copolymer (h), namely a hydrolyzable silyl-containing acrylic copolymer obtained by grafting the silicate compound.

Synthesis Example 9

Silicate-grafted Acrylic Copolymer (i)

A one-liter reaction vessel equipped with a thermometer, stirrer, condenser and nitrogen inlet tube was purged with nitrogen gas and then charged with 120 mass parts of MKC Silicate MS-60 (product of Mitsubishi Chemical) as a silicate compound, 545 mass parts of the hydrolyzable silyl-containing acrylic copolymer (e) obtained in Synthesis Example 5 and 5 mass parts of trimethyl orthoacetate, and the grafting reaction was allowed to proceed at 110° C. for 4 hours and, after cooling, 71 mass parts of isopropyl alcohol was added to give a varnish with a nonvolatile matter content of 59% which contained a silicate-grafted acrylic copolymer (i), namely a hydrolyzable silyl-containing acrylic copolymer obtained by grafting the silicate compound.

Synthesis Example 10

Silicate-grafted Acrylic Copolymer (j)

A one-liter reaction vessel equipped with a thermometer, stirrer, condenser and nitrogen inlet tube was purged with nitrogen gas and then charged with 80 mass parts of MKC Silicate MS-56 (product of Mitsubishi Chemical) as a silicate compound, 366 mass parts of the hydrolyzable silyl-containing acrylic copolymer (f) obtained in Synthesis Example 6 and 5 mass parts of trimethyl orthoacetate, and the grafting reaction was allowed to proceed at 100° C. for 7 hours to give a varnish with a nonvolatile matter content of 56% which contained a silicate-grafted acrylic copolymer (j), namely a hydrolyzable silyl-containing acrylic copolymer obtained by grafting the silicate compound.

Synthesis Example 11

Hydrolyzable Silyl-containing Copolymer (k)

A 2-liter reaction vessel equipped with a thermometer, stirrer, condenser, nitrogen inlet tube and dropping funnel was charged with 600 mass parts of Solvesso 100, and the temperature was raised to 125° C. To this reaction vessel was added dropwise, using the dropping funnel, over 3 hours a solution composed of 400 mass parts of glycidyl methacrylate, 210 mass parts of styrene, 135 mass parts of 4-hydroxybutyl acrylate, 307 mass parts of isobutyl methacrylate, 116 mass parts of tert-butyl peroxy-2-ethylhexanoate and 116 mass parts of Solvesso 100. Thereafter, the temperature was maintained at 125° C. for 30 minutes and, then, a solution composed of 11 mass parts of tert-butyl peroxy-2-ethylhexanoate and 20 mass parts of Solvesso 100 was added dropwise over 30 minutes. After this dripping, the reaction was further allowed to proceed at 125° C. for 1 hour to give a varnish with a nonvolatile matter content of 60% which contained a hydrolyzable silyl-containing copolymer (k) having a number average molecular weight of 3,500, an epoxy equivalent of 374 (on solids basis) and ahydroxyl value of 50 mg KOH/g (on solids basis).

EXAMPLES 1 TO 5

Clear coatings of the invention for top coating of automobiles were prepared by mixing up the resin constituents specified in Table 1 (given on solids basis), together with 2 mass parts of Ciba Specialty Chemicals' ultraviolet absorber Tinuvin 900 (trademark), 1 mass part of Sankyo's light stabilizer Sanol LS-440 (trademark) and 0.1 mass part of Monsanto's surface modifier Modaflow (trademark), with stirring by means of a Disper agitator.

Then, each clear coating for top coating of automobiles was diluted to a coating viscosity using a thinner composed of butyl acetate and xylene (1/1). Test specimens prepared by coating phosphate-treated steel sheets with Nippon Paint's cationic electrodeposition coating Powertop V-20 and polyester/melamine type gray intermediate coating Orga TO H-870 (both trademarks) to dry coating film thicknesses of 25 $\mu$m and 40 $\mu$m, respectively, followed by heat curing were coated with Nippon Paint's silver metallic base coating Orga TO H-300 (trademark) and, then, the diluted clear coating of the invention for top coating of automobiles was applied thereonto by the wet-on-wet technique. Thereafter, baking/heating was effected at 140° C. for 30 minutes. Thus were prepared test specimens coated by the two-coat one-bake (2C1B) coating technique. The cured coating films from the base coating and clear coating were formed so that they might have dry coating film thicknesses of 15 $\mu$m and 40 $\mu$m, respectively.

Separately, test specimens prepared by coating phosphate-treated steel sheets with Nippon Paint's cationic electrodeposition coating Powertop V-20 and Orga TO H-870 (both trademarks) to dry film thicknesses of 25$\mu$m and 40 $\mu$m, respectively, followed by heat curing were coated with Nippon Paint's silver metallic base coating Orga TO H-300 (trademark) and, then, Nippon Paint's clear coating Orga TO-563 (trademark) was applied by the wet-on-wet technique, and baking/drying was carried out at 140° C. for 30 minutes. Then, the diluted clear coating for top coating of automobiles was applied thereonto and baking/heating was effected at 140° C. for 30 minutes. Thus were prepared test specimens coated by the three-coat two-bake (3C2B) coating technique. The cured coating films from the silver metallic base coating, the clear coating Orga TO-563 and the clear coating according to the invention were formed so that they might have dry film thicknesses of 15 $\mu$m, 40 $\mu$m and 40 $\mu$m, respectively.

The coatings thus obtained were evaluated by the evaluation methods described below. The results obtained are given in Table 1.

Evaluation methods (1) Storage Stability

Each coating obtained was adjusted to an initial viscosity of 23 seconds (No. 4 Ford cup) and allowed to stand in an incubator at 40° C. for 10 days and, thereafter, the increase in viscosity (in seconds; No. 4 Ford cup) was determined. A smaller numerical value indicates superior storage stability.

(2) Acid Resistance Test

Each cured coating film obtained was contacted with 0.2 ml of 0.1 N aqueous $H_2SO_4$ at 80° C., for 30 minutes and the surface thereof was evaluated by the eye according to the following criteria:

○: No change is observed;
Δ: Slight trace is observable;
X: Distinct trace is observable.

(3) Water Resistance Test

Each cured coating film obtained was immersed in warm water at 40° C. for 10 days and then the coating film surface was evaluated by the eye according to the following criteria:

◎: No change is observed;
○: Very slight blushing is observed;
Δ: Slight blushing is observable;
X: Distinct blushing is observable.

(4) Initial Angle of Contact with Water 0.4 ml of deionized water was dropped onto each cured coating film obtained and, 30 seconds after dropping, the angle of contact was measured using Kyowa Kaimen Kagaku's Face automatic interfacial tension meter CA-Z.

(5) Outdoor Exposure Test

The outdoor exposure test prescribed in JIS K 5400 9.9 was carried out and, after the lapse of 1 month or 6 months, the angle of contact with water and the difference in lightness (ΔL) from the initial coating film were measured. A smaller lightness difference (ΔL) value indicates better stain resistance.

(6) Angle of Contact with Water on a Polished Section

The surface of each of the same specimens as described above (prepared by applying the clear coating of the invention onto the white top coat film, followed by baking) was polished with a #2400 sandpaper and further with a #4000 sandpaper and exposed at the same site. After 6 months, the angle of contact with water was measured.

COMPARATIVE EXAMPLE 1

A clear coating for top coating of automobiles was prepared and test specimens coated by the two-coat one-bake (2C1B) or three-coat two-bake (3C2B) coating technique were prepared in the same manner as in the Examples except that 21.5 mass parts of the half-esterified acid group-containing acrylic copolymer (a), 25 mass parts of the carboxyl-containing polyester resin (b), 53.5 mass parts of the epoxy-containing acrylic copolymer (k) and 30 mass parts of MKC Silicate MS-56 (product of Mitsubishi Chemical) as a silicate compound were used as resin constituents (solids). They were evaluated for coating film performance in the same manner as in the Examples. The results are given in Table 1.

COMPARATIVE EXAMPLE 2

A clear coating for top coating of automobiles was prepared and test specimens coated by the two-coat one-bake (2C1B) or three-coat two-bake (3C2B) coating technique were prepared in the same manner as in the Examples except that 52.5 mass parts of the half-esterified acid group-containing acrylic copolymer (a), 47.5 mass parts of the epoxy-containing acrylic copolymer (k) and 10 mass parts of MKC Silicate MS-60 (product of Mitsubishi Chemical) as a silicate compound were used as resin constituents (solids) They were evaluated for coating film performance in the same manner as in the Examples. The results are given in Table 1.

TABLE 1

|  |  |  | Example |  |  |  |  |  |  |  |  |  |
|---|---|---|---|---|---|---|---|---|---|---|---|---|
|  |  |  | 1 | | 2 | | 3 | | 4 | | 5 | |
| Formulation | Half-esterified acid group-containing acrylic copolymer (a) | | 52.5 | | 21.5 | | 21.5 | | 21.5 | | 21.5 | |
| | Carboxy-containing polyester resin (b) | | | | 25 | | 25 | | 25 | | 25 | |
| | Silicate-grafted acrylic resin | (g) | 67.5 | | 73.5 | | | | | | | |
| | | (h) | | | | | 73.5 | | | | | |
| | | (i) | | | | | | | 73.5 | | | |
| | | (j) | | | | | | | | | 83.5 | |
| | Epoxy-containing acrylic copolymer (k) | | | | | | | | | | | |
| | Silicate compound | MKC Silicate MS-56 *1 | | | | | | | | | | |
| | | MKC Silicate MS-60 *2 | | | | | | | | | | |
| | Silicate/total amount of resin constituents (%) | | 20 | | 20 | | 20 | | 20 | | 30 | |
| | Copolymerized hydrolyzable silyl-containing, radical-polymerizable monomer (%) | | 10 | | 10 | | 20 | | 29 | | 29 | |
| Performance | Storage stability (sec) | | +8" | | +18" | | +12" | | +15" | | +8" | |
| | Acid resistance | | ○ | | ○ | | ○ | | ○ | | ○ | |
| | Water resistance | | ⊚ | | ⊚ | | ⊚ | | ⊚ | | ○ | |
| Outdoor exposure | Coating method | | 2C/1B | 3C/2B | 2C/1B | 3C/2B | 2C/1B | 3C/2B | 2C/1B | 3C/2B | 2C/1B | 3C/2B |
| | Initial | Angle of contact with water | 82 | 81 | 81 | 80 | 77 | 78 | 76 | 78 | 77 | 78 |
| | 1 month | Angle of contact with water (normal section/polished section) | 35/51 | 34/49 | 36/49 | 38/53 | 30/41 | 32/40 | 32/40 | 32/41 | 34/43 | 32/41 |
| | | Stain resistance | — | — | — | — | — | — | — | — | — | — |
| | | (normal section) | 0.2 | 0.1 | .1 | 0.2 | 0.1 | 0.2 | 0.1 | 0.2 | 0.1 | 0.2 |
| | | (polished section) | 1.2 | 1.3 | 0.5 | 0.8 | 0.5 | 0.8 | 0.5 | 0.8 | 0.5 | 0.8 |
| | 6 months | Angle of contact with water (normal section/polished section) | 31/44 | 32/46 | 28/45 | 27/48 | 26/38 | 30/39 | 27/38 | 26/37 | 28/38 | 28/39 |
| | | Stain resistance | — | — | — | — | — | — | — | — | — | — |
| | | (normal section) | 0.2 | 0.3 | 0.3 | 0.3 | 0.3 | 0.3 | 0.3 | 0.3 | 0.3 | 0.3 |
| | | (polished section) | 1.5 | 1.3 | 0.4 | 0.7 | 0.4 | 0.7 | 0.4 | 0.7 | 0.4 | 0.7 |

|  |  |  | Compar. Ex. | |
|---|---|---|---|---|
|  |  |  | 1 | 2 |
| Formulation | Half-esterified acid group-containing acrylic copolymer (a) | | 21.5 | 52.5 |
| | Carboxy-containing polyester resin (b) | | 25 | |
| | Silicate-grafted acrylic resin | (g) | | |
| | | (h) | | |
| | | (i) | | |
| | | (j) | | |
| | Epoxy-containing acrylic copolymer (k) | | 53.5 | 47.5 |
| | Silicate compound | MKC Silicate MS-56 *1 | 30 | |
| | | MKC Silicate MS-60 *2 | | 10 |
| | Silicate/total amount of resin constituents (%) | | 30 | 10 |
| | Copolymerized hydrolyzable silyl-containing, radical-polymerizable monomer (%) | | 0 | 0 |

TABLE 1-continued

|  |  |  | +21" | | +43" | |
|---|---|---|---|---|---|---|
| Performance | Storage stability (sec) | | ○ | | ○ | |
|  | Acid resistance | | Δ | | X | |
|  | Water resistance | | | | | |
| Outdoor exposure | Coating method | | 2C/1B | 3C/2B | 2C/1B | 3C/2B |
|  | Initial | Angle of contact with water | 76 | 78 | 81 | 82 |
|  | 1 month | Angle of contact with water (normal section/polished section) | 32/66 | 32/69 | 34/63 | 32/65 |
|  |  | Stain resistance | — | — | — | — |
|  |  | (normal section) | 0.1 | 0.2 | 0.1 | 0.2 |
|  |  | (polished section) | 1.8 | 1.9 | 2.1 | 2.2 |
|  | 6 months | Angle of contact with water (normal section/polished section) | 32/60 | 32/61 | 34/62 | 32/61 |
|  |  | Stain resistance | — | — | — | — |
|  |  | (normal section) | 0.3 | 0.3 | 0.3 | 0.3 |
|  |  | (polished section) | 8.0 | 9.7 | 12.5 | 13.5 |

*1: Mitsubishi Chemical's methyl silicate (number average molecular weight 1300–1800)
*2: Mitsubishi Chemical's methyl silicate (number average molecular weight 2200–3000)

As is evident from Table 1, the clear coatings for top coating of automotive bodies as obtained in the Examples showed storage stability in a range satisfactory as clear coatings for top coating of automotive bodies. The cured coating films obtained therefrom showed basic performance characteristics satisfactory as water-resistant and acid-resistant coatings on automobiles. After one month of exposure and after 6 months of exposure, they showed a small angle of contact with water, normal sections of their coating film surface showed sufficient hydrophilicity and were excellent in stain resistance and, furthermore, polished sections of their coating film surface were also excellent in stain resistance.

On the contrary, the clear coatings for top coating of automobiles as obtained in Comparative Examples 1 and 2 were inferior in water resistance and storage stability. With the clear coatings for top coating of automobiles as obtained in Comparative Examples 1 and 2, the angles of contact with water on polished sections after 1 month of storage and after 6 months of storage were large and thus the coating film surfaces failed to show sufficient hydrophilicity and thus were inferior in stain resistance.

What is claimed is:

1. A clear coating for top coating of automobiles which comprises a half-esterified acid group-containing acrylic copolymer (I) and a silicate-grafted acrylic copolymer (II) as resin constituents, said half-esterified acid group-containing acrylic copolymer (I) being obtainable by:
preparing a copolymer from an acid anhydride group-containing, radical-polymerizable monomer (I-a) and another radical-polymerizable monomer (I-b) and then half-esterifying said acid anhydride group with a low-molecular alcohol compound, said silicate-grafted copolymer (II) being obtainable by grafting a silicate compound (II-B) onto a hydrolyzable silyl-containing copolymer (II-A), said silicate compound (II-B) being represented by the general formula (1):

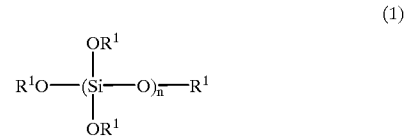

wherein n represents an integer of 1 to 50 and the $R^1$ groups may represent different groups and each represents a substituted or unsubstituted organic group containing 1 to 20 carbon atoms, and the amount of said silicate compound (ii-b) grafted being 5 to 50% by mass (on solids basis) relative to the total amount of said resin constituents.

2. The clear coating for top coating of automobiles according to claim 1,
wherein said hydrolyzable silyl-containing copolymer (II-A) is an acrylic copolymer obtainable by copolymerizing a hydrolyzable silyl-containing, radical-polymerizable monomer (II-A-a) and a hydroxyl-containing, radical-polymerizable monomer (II-A-b).

* * * * *